(12) United States Patent
Esau et al.

(10) Patent No.: US 6,347,503 B1
(45) Date of Patent: Feb. 19, 2002

(54) FLIP-UP ARRANGEMENT FOR A MOWER DECK

(75) Inventors: Merlin L. Esau, Newton; Leroy F. Koehn, Moundridge, both of KS (US)

(73) Assignee: Moridge Manufacturing, Inc., Moundridge, KS (US)

( * ) Notice: Subject to any disclaimer, the term of this patent is extended or adjusted under 35 U.S.C. 154(b) by 0 days.

(21) Appl. No.: 09/260,602

(22) Filed: Mar. 2, 1999

(51) Int. Cl.[7] ............................................. A01D 34/43
(52) U.S. Cl. ................................. 56/15.9; 56/DIG. 22
(58) Field of Search ........................... 56/15.7, 15.8, 56/15.9, 17.1, DIG. 22, DIG. 9; 172/466; 280/481

(56) References Cited

U.S. PATENT DOCUMENTS

| | | | |
|---|---|---|---|
| 4,660,654 A | * 4/1987 | Wiebe et al. | 172/776 |
| 4,742,671 A | * 5/1988 | Bich | 56/15.9 |
| 4,760,686 A | * 8/1988 | Samejima et al. | 56/15.8 |
| 4,779,406 A | * 10/1988 | Schroeder | 56/15.9 |
| 4,997,333 A | * 3/1991 | Ball et al. | 414/694 |
| 5,069,022 A | * 12/1991 | Vandermark | 56/6 |
| 5,079,907 A | * 1/1992 | Sameshima et al. | 56/15.9 |
| 5,459,984 A | * 10/1995 | Reichen et al. | 56/7 |
| 5,475,971 A | * 12/1995 | Good et al. | 56/14.9 |
| 5,528,886 A | 6/1996 | Esau | |
| 5,927,055 A | * 7/1999 | Ferree et al. | 56/15.9 |

FOREIGN PATENT DOCUMENTS

| | | | |
|---|---|---|---|
| GB | 2199225 | * 11/1987 | 56/15.8 |

* cited by examiner

Primary Examiner—Thomas B. Will
Assistant Examiner—Meredith C. Petravick
(74) Attorney, Agent, or Firm—Shook, Hardy & Bacon L.L.P.

(57) ABSTRACT

A mower includes a propelling vehicle and a mower deck having at least one mower blade and positioned adjacent the front end of the vehicle. A lift shaft is rotatably supported by the mower deck and extends transversely across the deck. At least one hitch arm is fixedly coupled on one end to the lift shaft and attached to the front end of the propelling vehicle on its other end. A rotatable joint is located adjacent the lift shaft and allows the deck to be rotated from a horizontal position to a raised position to allow access to the mower blade.

13 Claims, 4 Drawing Sheets

FLIP-UP ARRANGEMENT FOR A MOWER DECK

CROSS REFERENCE TO RELATED APPLICATIONS

None.

Statement Regarding Federally-Sponsored Research or Development

None.

FIELD OF INVENTION

This invention relates to a flip-up deck arrangement for positioning a mower deck between an operating position, and a storage/cleaning position.

Tractors or dedicated lawn care vehicles are often fitted with mowing decks to allow the tractor or vehicle to perform a grass or vegetation cutting function. These mowing decks typically have a plurality of cutting blades rotatably mounted to a deck housing. The cutting blades serve to cut the growing grass in a swath as the tractor with the attached deck moves along the ground. The deck and attached cutting blades are vertically adjustable by an adjusting mechanism to attain the desired cutting depth. The cutting blades are normally linked together via a driving arrangement of spindles and belts or chains. Power is supplied to the driving arrangement of the deck by the tractor via a power takeoff or some other drive belt or drive chain arrangement.

A lawn mower operator needs the capability of hitching and unhitching the mower deck to and from the vehicle used to propel the mower deck. Removal of the deck allows the operator to perform maintenance on the deck that would not be possible when the deck is attached to the vehicle. Further, an operator may wish to interchange different types of mowing decks or exchange the mowing deck with a different utility implement, for example, a snow blower or snow blade. An extremely advantageous hitching arrangement is disclosed in U.S. Pat. No. 5,528,886 to Esau, which is herein incorporated by reference. This patent discloses a hitching arrangement between a mower deck and a propelling vehicle. The hitching arrangement includes a lift shaft rotatably supported by the mower deck and extending transversely across the deck. It further includes at least one hitch arm fixedly secured on one end to the lift shaft, and the hitch arm having a hook located on its other end with a downwardly facing opening adapted for engagement with a generally horizontally disposed attaching member on the propelling vehicle. The cutting height adjustment mechanism is also operably coupled to the lift shaft and adjusts the cutting height of the mower. The adjustment mechanism has a first position corresponding to an elevated cutting height of the mower deck and a second position corresponding to a lowered cutting height of the deck. A deck stand is provided which is releasably attached to the deck. When the deck stand is attached to the deck, movement of the adjustment mechanism toward its second position causes the hitch arm to be swung upwardly to disengage the hook from the attaching member, and the movement of the adjustment mechanism toward its first position causes the hitch arm to be swung downwardly for engaging the hook with the attaching member. As is apparent, this hitching arrangement allows the operator an easy and efficient operation to connect and disconnect the mower deck from the propelling vehicle utilizing the existing height adjusting mechanism of the mower deck.

Although a highly advantageous hitching arrangement, the mower deck of U.S. Pat. No. 5,528,886 does suffer from some drawbacks. In particular, first, the disclosed mower deck does not provide easy access to the bottom of the deck for cleaning and/or maintenance of the blade area. During operation, the blade area and the shrouds surrounding the blades are likely to collect dirt and grass clippings, especially if the vegetation being mowed is moist. Therefore, it may be desirous to be able to clean the bottom of the deck immediately after a mowing operation, and possibly even midway during a mowing operation. With the deck disclosed in U.S. Pat. No. 5,528,886, in order to clean the deck, it may be necessary to disconnect the deck from the vehicle and set it up on end to perform the cleaning operation. As is apparent, the disconnecting and reconnecting of the deck to the propelling vehicle can result in a loss of time and efficiency.

An additional drawback of the mower deck described in the patent is the amount of storage space necessary for the propelling vehicle and deck when the deck is attached to the vehicle. In particular, the longitudinal distance from the front of the deck to the rear of the propelling vehicle can be substantial. Oftentimes it would be desirable to decrease such distance, either for storage in a storage shed, or for transportation on a trailer, while at the same time maintaining the connection between the deck and the vehicle.

Thus, a mower deck attaching arrangement is needed which allows easy and efficient access to the bottom of the mower deck when still connected to the propelling vehicle. Further, a hitching mechanism is needed which allows the reduction in the storage space necessary for the propelling vehicle and mower deck when connected together.

SUMMARY OF THE INVENTION

Accordingly, it is an object of the present invention to provide a deck arrangement which allows access to the cutting blade area of the deck, even when the deck is connected to a propelling vehicle.

A further object of the present invention is to provide a deck that is positionable between a horizontal position and a raised position to allow easy storage of a propelling vehicle/deck combination.

A still further object of the present invention is to provide a propelling vehicle/deck combination which allows the deck and propelling vehicle to be moved with the deck in a raised stored position.

Yet another object of the present invention is to provide a flip-up deck arrangement wherein the deck is locked in a horizontal operating position, and can be manually unlocked from such position and thereafter raised, and wherein the deck automatically locks in its horizontal position when lowered.

Another object of the present invention is to provide a mower deck which has a height adjusting lever which is collapsible and which does not interfere with the raising and lowering of the deck between an operating and a raised position.

Accordingly, the present invention provides for a mower having a propelling vehicle and a mower deck with at least one mower blade positioned adjacent the front of the vehicle. A lift shaft is rotatably supported by the mower deck and extends transversely across the deck. A hitch arm is fixably coupled on one end to the lift shaft and attached to the front end of the propelling vehicle on its other end. A rotatable joint is located adjacent the lift shaft and allows the deck to be rotated from a horizontal position to a raised position to allow access to the mower blade.

The invention further provides for a flip-up mower deck for attachment to a propelling vehicle. The deck includes a lift shaft rotatably supported by the mower deck and extending transversely across the deck. At least one hitch arm is coupled on one end to the propelling vehicle and coupled on the other end to the lift shaft through a rotating joint. The rotating joint has a locked and an unlocked position. The locked position of the joint substantially fixes the hitch arm with respect to the lift shaft, and the unlocked position allows the hitch arm to rotate with respect to the lift shaft so that the deck can be positioned in a raised position.

The invention further provides for a mower deck rotating mechanism for allowing a mower deck to be transitioned between a generally horizontal operating position and a raised position when the deck is attached to a propelling vehicle. The mechanism includes a hitch arm attached on one end to the propelling vehicle and rotatably attached on the other end to the deck. A latch member is rotatably attached to one of said hitch arm and the deck. A lock pin is disposed on one of said hitch arm and said deck. The latch member is movable between a locked position wherein the latch member engages the lock pin and an unlocked position wherein the latch member is disengaged from the lock pin.

Additional objects, advantages, and novel features of the invention will be set forth in part in the description which follows, and in part will become apparent to those skilled in the art upon examination of the following, or may be learned by practice of the invention.

BRIEF DESCRIPTION OF THE DRAWINGS

In the accompanying drawings, which form a part of this specification and are to be read in conjunction therewith, and in which like references are used to indicate like parts in the various views.

DETAILED DESCRIPTION OF THE PREFERRED EMBODIMENTS

A mower deck combining the principles of this invention is broadly designated in the drawings by the reference numeral 20. Deck 20 has a housing 22 which contains the cutting blades (not shown) and the drive arrangement for the cutting blades. The cutting blades are driven through a power take-off shaft (not shown) of the lawn care vehicle or tractor 24.

Figure 3:
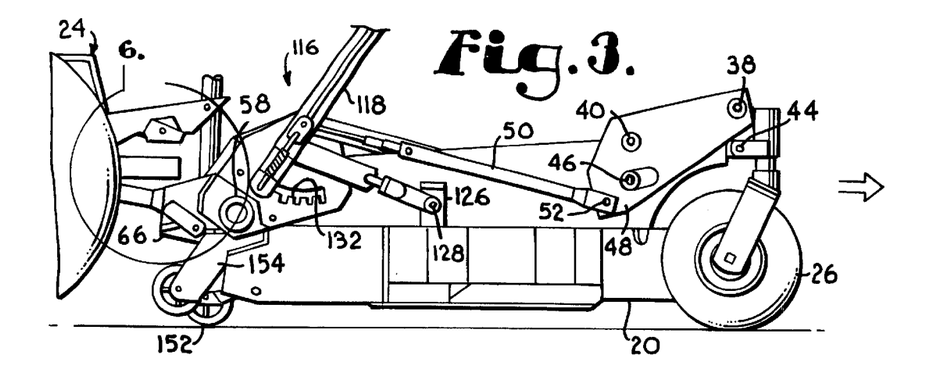
FIG. 3 is a side elevational view similar to FIG. 2, but showing the hitch arms in their lowered pivotal positions, and connected to the hitch structure of the propelling vehicle.

Housing 22 has castor wheels 26 mounted on opposite sides at its forward end, the direction of travel of the deck being shown by the arrow in FIG. 3. Wheels 26 are rotatably supported by forks 28 which in turn are connected to pivot assemblies 30. Pivot assemblies 30 are connected by parallel linkages 32 to support members 34 extending upwardly from and rigidly connected to the upper surface of housing 22. Each linkage 32 has an upper rigid channel link 36 which is pivotally secured on one end to support member 34 at pivot point 40, and pivotally secured at its other end to assembly 30 at pivot point 38. Each linkage 32 also has lower link 42 which is disposed below and completely separate from channel link 36. Each lower member 42 is pivotally connected at one end to supporting member 34 at pivot point 46, and pivotally connected at its other end to assembly 30 at pivot point 44. Thus, linkage 32 allows wheels 26 to be pivoted vertically with respect to the deck between a raised position corresponding to a low cutting height for the front portion of deck 20 and a lowered position corresponding to a high cutting height for the front portion of deck 20.

Figure 1:
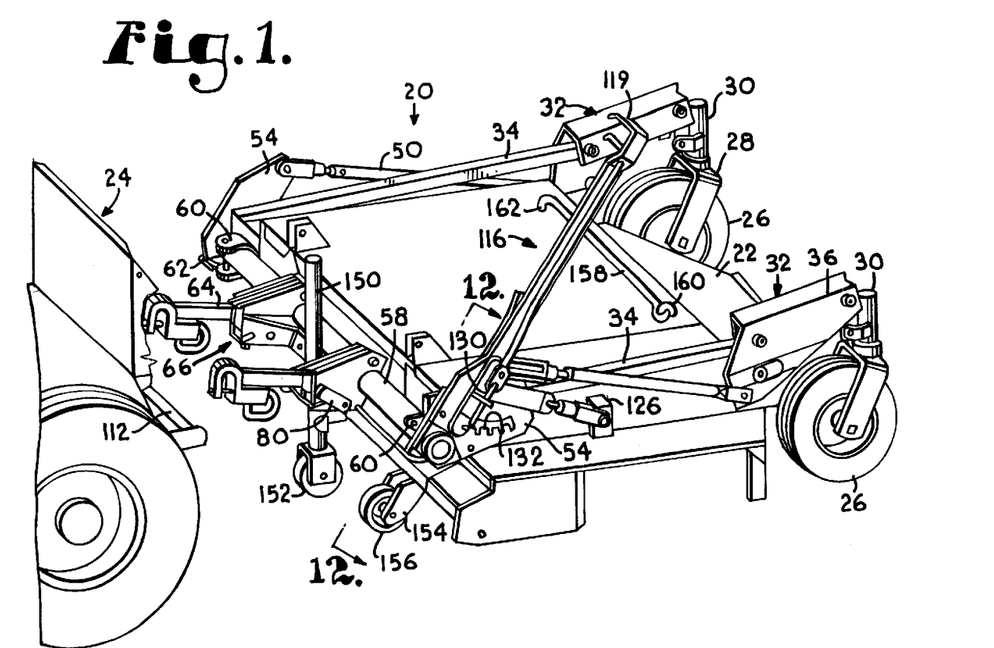
FIG. 1 is a top perspective view of a mower deck prior to attachment to a propelling vehicle, and having the flip-up deck arrangement embodying the principles of this invention.
Figures 7, 8, 11:
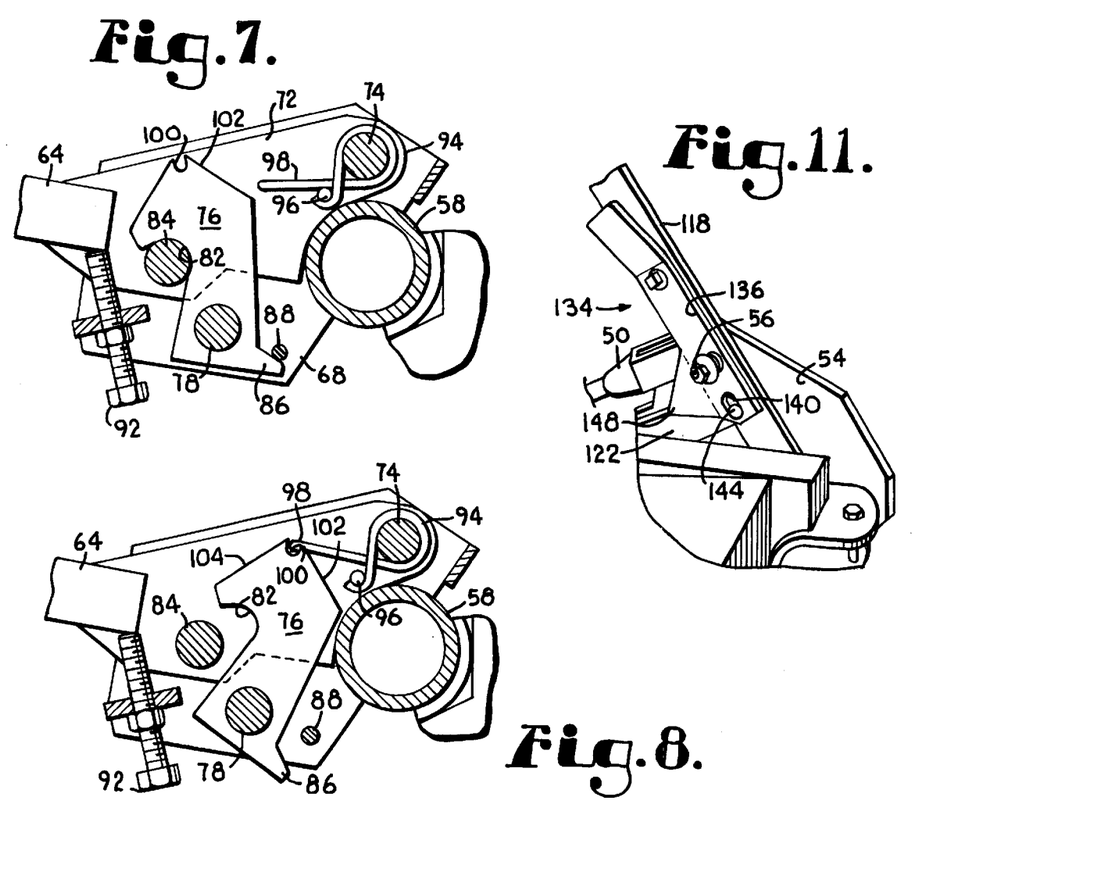
FIG. 7 is a cross-sectional view taken generally along line 7—7, and showing the hinge/joint mechanism in its locked position, wherein the latch member is engaging the lock pin to maintain the hitch arm in a fixed relationship to the lift shaft of the mower deck.
FIG. 8 is a view similar to FIG. 7, but showing the latch member disengaged from the lock pin and the latch member held temporarily in such disengaged position prior to rotation of the deck to its raised position.
FIG. 11 is a top isolated perspective view of the collapsible height adjustment lever assembly of the present invention.
Figures 9, 10, 12:
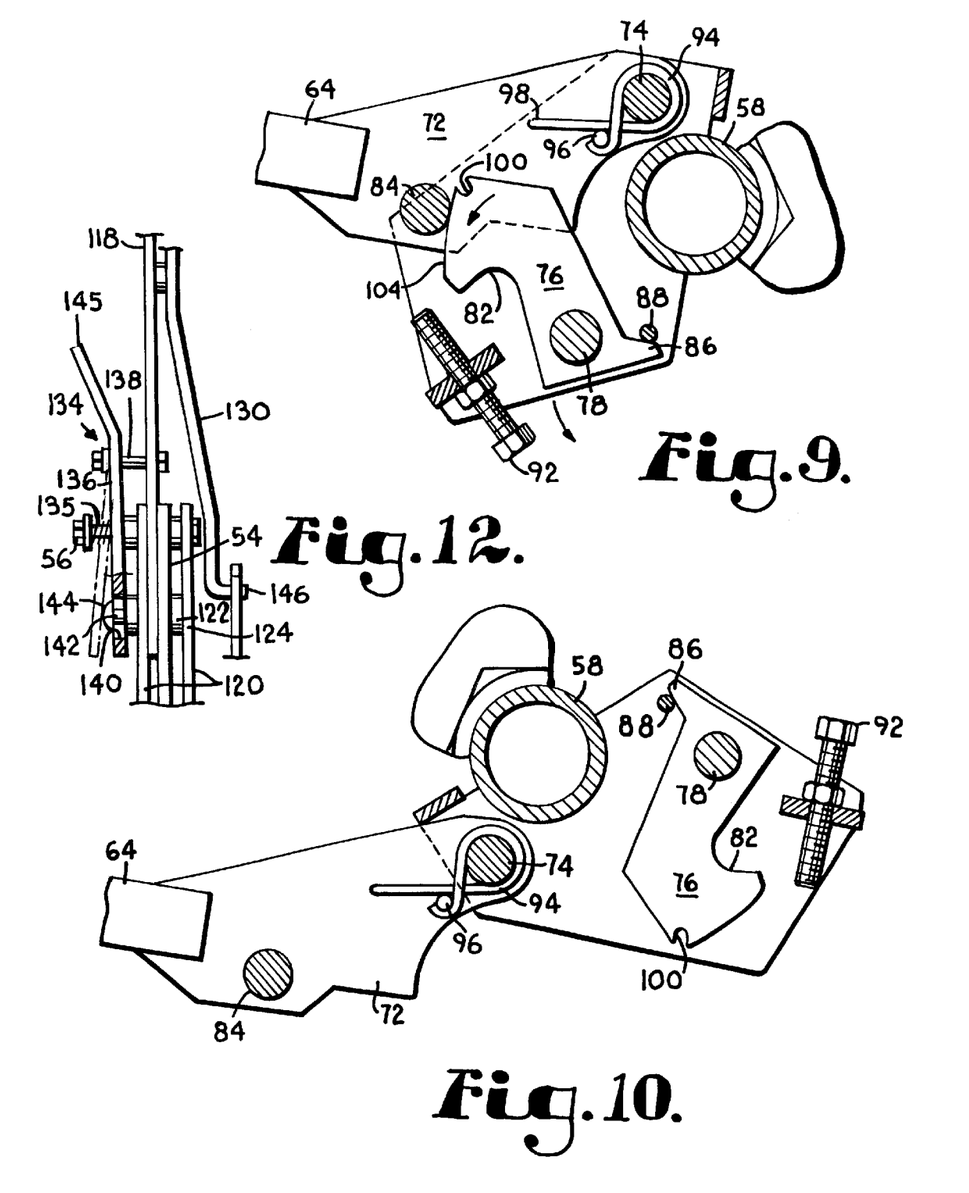
FIG. 9 is a view similar to FIG. 8, but showing the deck being raised to its upper position and the release of the latch member from its holding position so that it returns to its normally biased position after the hook portion of the latch member has cleared the lock pin.
FIG. 10 is a view similar to FIG. 9, but showing the hinge/joint mechanism when the deck is in its fully raised position.
FIG. 12 is a top plan view of the collapsible arm mechanism taken generally along line 12—12 of FIG. 1.

Each channel member 36 has a downwardly extending connecting flange 48. Flanges 48 are pivotally connected to the ends of corresponding, rigid linkage arms 50 at pivot points 52. The other ends of arms 50 are each pivotally connected to their corresponding one of a pair of actuating plates 54 by a bolt 56, as best shown in FIGS. 11 and 12. Each plate 54 is fixedly secured to its respective opposite end of a lift shaft 58 extending transversely across the rear end of the deck. Shaft 58 is pivotally connected to the deck by U-shaped receiving members 60. With reference to FIG. 1, the upper portions of members 60 are shown. Each member 60 curves downwardly from its upper portion to a lower portion to form a U-shaped receiving aperture. The open end of each U-shaped aperture faces toward tractor 24. Shaft 58 is held in the U-shaped apertures of members 60 by bolts 62, as best shown in FIG. 1.

Figure 4:
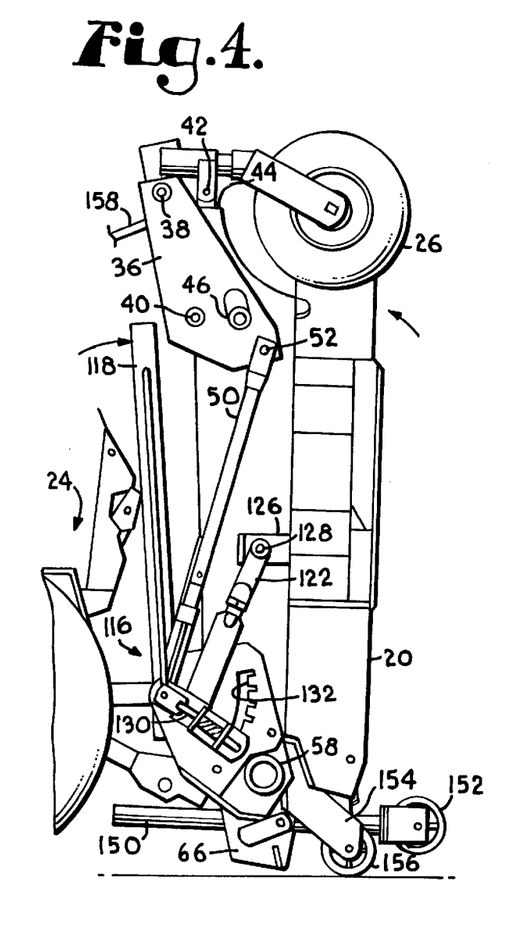
FIG. 4 is a view similar to FIG. 3, but showing the deck in its raised position, and the height adjustment lever in its stored position.
Figure 6:
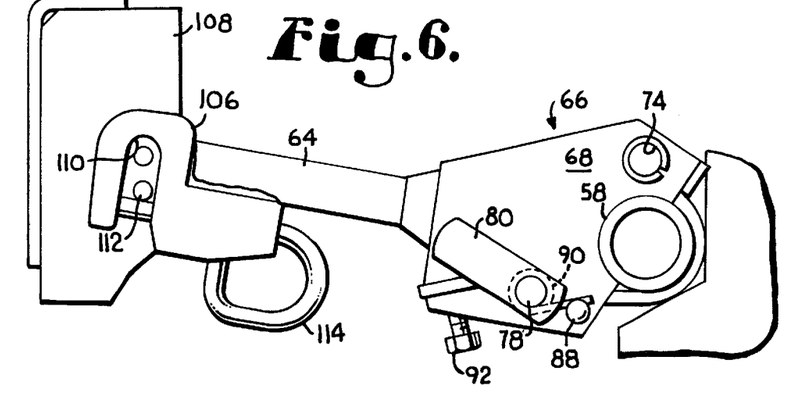
FIG. 6 is a side elevational view of the area designated by the numeral "6" in FIG. 3 and showing in isolation the hinge/joint mechanism in its locked position.

Hitch arms 64 are coupled to the periphery of shaft 58 via rotatable locking hinge/joint mechanisms 66, as best shown in FIGS. 1 and 6. Mechanisms 66 have a locked position and an unlocked position. In the locked position, mechanism 66 fixes hitch arm 64 with respect to lift shaft 58, such that rotation of lift shaft 58 results in rotation of hitch arm 64. This rotation of arm 64 with shaft 58 is important to the height adjustment of the mowing deck, and also to the hooking and unhooking operation of the deck. In an unlocked position, mechanisms 66 allow rotation of hitch arms 64 with respect to shaft 58. In this unlocked position, deck 20 can be rotated to a raised configuration, as shown in FIG. 4, because of the rotatable linkage between hitch arm 64 and shaft 58.

Figure 5:
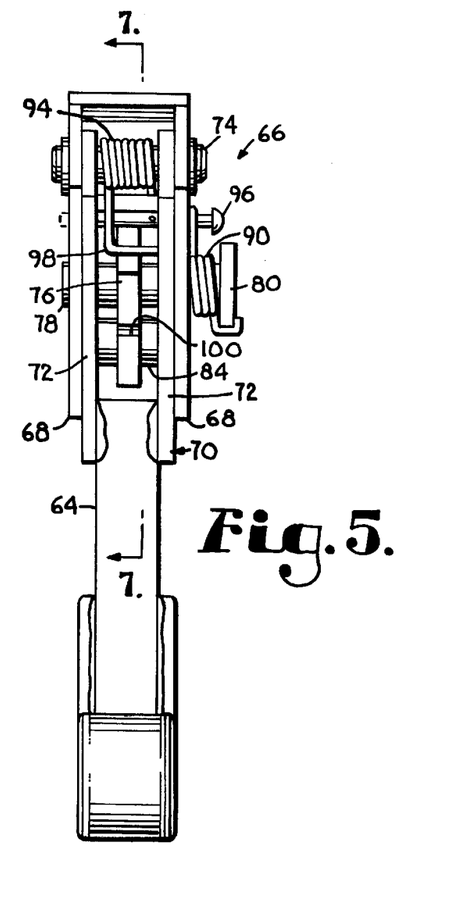
FIG. 5 is a top plan view taken general along line 5—5 of FIG. 2, and showing in isolation the hinge/joint mechanism in its locked position.

Each mechanism 66 includes a pair of spaced mounting plates 68 which are rigidly secured to the periphery of shaft 58, as best shown in FIGS. 5 and 6. Received between each pair of mounting plates 68 and pivotally secured thereto is a forked mounting structure 70 of hitch arm 64. Each fork structure 70 has a pair of spaced plates 72 which are generally parallel and lie between the spaced mounting plate 68, as best shown in FIG. 5. Plates 68 and plates 72 are pivotally connected together via a pivot pin 74 which extends through aligned apertures in each of plates 68 and 72. Pin 74 serves as the main pivoting point between lift shaft 58 and hitch arm 64. It is about this point which the deck pivots when raised from its horizontal position to its raised position shown in FIG. 4.

With reference to FIG. 7, a latch 76 is pivotally mounted between mounting plates 68 via an actuating shaft 78. More specifically, latch 76 is fixedly secured to the periphery of actuating shaft 78, such that rotation of shaft 78 results in rotation of latch 76. With reference to FIG. 6, disposed on one end of actuating shaft 78 is a manually operable unlocking lever 80. Lever 80 is utilized by the operator to rotate shaft 78 and thus latch 76 to a disengaged position, as will be more fully described. Latch 76 has a hook portion 82 which engages a locking pin 84 which extends between and is connected to space plates 72 of hitch arm fork structure 70. Latch 76 additionally has an appendage 86 which engages an abutment pin 88, which also extends between plates 72 of fork structure 70. As shown in FIG. 7, when mechanism 66 is in its locked position, hook 82 engages locking pin 84, and appendage 86 engages abutment pin 88. This structure prevents rotation of hitch arm 64 with respect to lift shaft 58. As will be more fully described below, this rigid locking connection allows the height adjustment of deck 20, and further allows the accomplishment of the hitching and unhitching operations. As best shown in FIG. 5, a torsion spring 90 is positioned around shaft 78 and abuts against pin 88 so as to bias latch 76 toward engagement with locking pin 84. Thus, torsion spring 90 ensures that latch 76 remains in a locked position and prevents rotation, until desired by the operator. Mounting plates 68 also have positioned therebetween an adjusting bolt 92 which is utilized to adjust the angle of hitch arm 64.

With reference to FIG. 8, an intermediate configuration of mechanism 66 is shown. In this configuration, latch 76 is shown disengaged from locking pin 84 and held in an intermediate holding position by a further torsion spring 94. Torsion spring 94 is positioned around pivot pin 74 between mounting plates 68 and space plates 72. Torsion spring 94 is further held in position by a release pin 96. Spring 94 has a forwardly extending L-shaped member 98 which engages a notch 100 formed on the upper end of latch 76 when the latch is in this intermediate position, as best shown in FIG. 8. In particular, this intermediate position temporarily holds latch 76 away from engagement with pin 84 such that an operator can rotate deck 20 upwardly. To obtain this intermediate position, an operator simply rotates lever 80 in a clockwise direction in FIG. 6 against the bias of spring 90. During this rotation, a slanted camming surface 102 of latch 76 engages L-shaped member 98 and begins to bias spring 94 until such point as L-shaped member 98 engages notch 100. After this engagement, the operator manipulating lever 80 senses a click, and lever 80 and thus latch 76 is held in this disengaged position. The operator is then free to rotate deck 20 upwardly from its front end, as indicated by the arrow in FIG. 4. With reference to FIG. 9, as this is done, L-shaped member 98 will abut against release pin 96. Further rotation results in L-shaped member 98 being disengaged from notch 100, and thus latch 76 rotating in a counterclockwise direction because of the bias of torsion spring 90. As shown in FIG. 9, the predetermined rotational position where L-shaped member 98 disengages notch 100 is at a point where hook 82 will no longer engage locking pin 84, but where appendage 86 will engage pin 88. At this position, a further camming surface 104 of latch 76 does engage locking pin 84. Camming surface 104 is important to the repositioning of mechanism 66 to its locking position when the deck will be returned to its horizontal position, as will be more fully described below. Further rotation of mechanism 66 is shown in FIG. 10 wherein the deck is in its fully raised position, as shown in FIG. 4.

Each hitch arm 64 has a hook 106 disposed on its distal end from mechanism 66 for engagement with hitch structure 108 of vehicle 16. With reference to FIG. 6, hooks 106 have downwardly facing openings 110 which receive attaching bushings 112 of hitch structure 108. Hooks 106 also have latch pin mechanisms 114 for securing the hooks about bushings 112.

With reference to FIGS. 2, 3, 11 and 12, the actuating plate 54 located on the right side of FIG. 1 has height adjusting assembly 116 connected thereto. Assembly 116 has a lift lever 118 with a distal or handle end 119. The lift lever 118 is pivotally secured to actuating plate 54 by the same bolt 56 used to pivotally secure linkage arm 50 thereto. Further, with references to FIGS. 11 and 12, a pair of lever extension plates 120 are also pivotally mounted about bolt 56 and extend downwardly from bolt 56. Lever extensions 120 are pivotally secured at an intermediate location to an end of rigid linkage arm 122 at a pivot point 124. The other end of arm 124 is pivotally secured to a rigid mounting flange 126 at a pivot point 128. Flange 126 is rigidly secured to the top surface of housing 12. Lever 118 further has a spring-biased locking mechanism 130 which engages a tooth slot 132 of actuating plate 54 to secure or hold deck 20 at a particular cutting height.

With reference to FIGS. 11 and 12, a lever folding mechanism 134 extends between lever 118 and lever extensions 120. In particular, mechanism 134 allows an operator to fold lever 118 downwardly along the top surface of deck 20, as shown in FIG. 4, so that the lever will not interfere with the fold-up operation of the deck. Still further, mechanism 134 can maintain a rigid connection between lever extensions 120 and lift lever 118 to perform the height adjusting operation of the deck, and further to perform the hitching and unhitching operations. Mechanism 134 includes a manual actuating plate 136 pivotally mounted about bolt 56. A spring 135 is also positioned on bolt 56 to bias plate 136 toward plate 54. The aperture in plate 136 that surrounds bolt 56 is somewhat oval in shape such that plate 136 can tilt upon bolt 56, as shown in FIG. 12 in phantom lines. The upper end of plate 136 is slidably connected to lever 118 via a bolt 138. The lower end of plate 136 has an oblong locking aperture 140 disposed therein. Locking aperture 140 is used to engage an end 144 of bolt 142 which forms pivot point 124 between extensions 120 and linkage arm 122. Lever 118 itself is not pivotally mounted to bolt 142, but does abut it when in its upper operating position. Additionally, bolt 142 is not pivotally or rigidly attached to actuating plate 54, but extends through a crude slot formed therein which allows movement of the plate with respect to bolt 142.

With reference to FIG. 12, plate 136 operates to form a rigid linear connection between lever 118 and lever extensions 120 when needed for height adjustment of the mower deck. More specifically, when locking aperture 140 engages bolt 142, lever 118 and extensions 120 rotate together about bolt 56 and can be utilized to adjust the height. When it is desirous to fold lever 118 along the top surface of deck 20, actuating end 145 of plate 136 is pushed toward lever 118 such that locking aperture 140 disengages bolt end 144. As this is done, lever 118 can be rotated about bolt 56 and with respect to lever extensions 120. Pivot point 146 also allows rotation of lever 118 with respect to locking mechanism 130. In this manner, lever 118 can be laid along the top surface of deck 20, for the raising operation.

With reference to FIG. 11, plate 136 also has an angled camming appendage 148. Camming appendage 148 operates to position locking aperture 140 about bolt end 144 when lever 118 is rotated from its stored position on top of deck 20 to its operating position. More specifically, camming appendage 148 will engage the end 144 of bolt 142 as lever 118 is rotated to its operating position, and thereafter tilt plate 136 automatically until such time as aperture 140 engages bolt 142.

Figure 2:
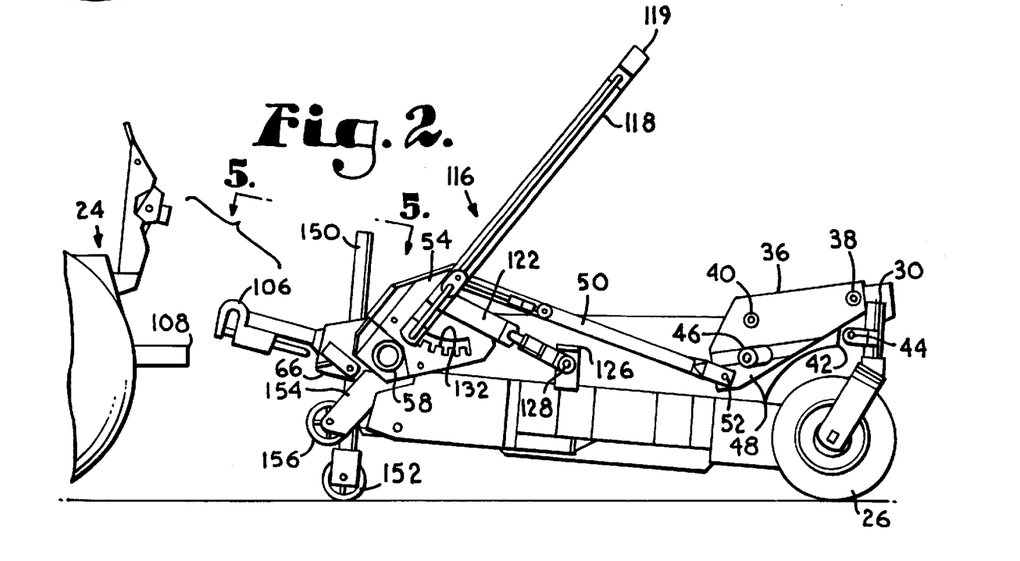
FIG. 2 is a side elevational view of the mower deck of FIG. 1 showing the hitch arms in their upper pivotal position prior to connection of the arms to the hitch structure of the propelling vehicle.

With reference to FIGS. 1 and 2, a removable deck stand 150 is used during the hitching and unhitching operations of deck 20. Deck stand 150 is attached to deck 20 via an attaching bracket (not shown). The attaching bracket can have a plurality of vertically stacked adjusting apertures for adjusting alignment with transversely extending apertures in stand 150. Stand 150 can be secured to the bracket by aligning the appropriate apertures of the bracket with the aperture in the deck stand and placing a pin therethrough. Deck stand 150 further has a roller 152 pivotally mounted on its lower end to aid the hitching and unhitching action. Also positioned adjacent the rear edge of deck 20 on opposite sides thereof is a tilting support member 154. Each support member is rigidly secured to housing 22 and has a roller 156 on its lower end. Supports 154 serve to engage the ground when deck 20 is rotated to its raised position, as shown in FIG. 4. Rollers 156 also roll across the ground if it is desired to move the combined deck and tractor in the raised connected position.

With reference to FIG. 1, positioned on the forward surface of deck 20 is a raised position securing linkage 158. In particular, linkage 158 is used to secure deck 20 in its raised position as shown in FIG. 4. Linkage 158 is hingedly secured to housing 22 at hinge area 160, and has a hook end 162 which can be positioned in any suitable aperture or ledge on tractor 24 to secure deck 20 in its raised position.

With reference to FIGS. 1–3, and 6 the hitching of deck 20 to vehicle 24 will be described. Hitch structure 108 of vehicle 24 is located on the front of the vehicle so that deck 20 is positioned in front of the vehicle after it has been connected. As shown in FIGS. 1 and 2, deck 20 is in a horizontal storage position wherein deck stand 150 is disposed in its support bracket and supports the rear portion of the deck. Further, lever 118 is in its most forward position so that wheels 26 are completely raised and the forward portion of housing 22 is at its lowest possible cutting depth. In this position, arms 64 are generally angled upwardly and pivotally raised. Additionally, latch mechanisms 66 are in their locked position, as shown in FIGS. 5 and 7. Still further, latch pin mechanisms 114 are in their open positions. In this horizontal stored position, vehicle 24 is driven toward deck 20 so that hitch arms 64 are aligned with their respective attaching bushings 112.

After hooks 106 of arms 64 are aligned above bushings 112, lever 118 is moved rearwardly so that hitch arms 64 are pivoted downwardly, and openings 110 receive bushings 112. More particularly, the rearward movement of lever 118 pivots lever 118 and extensions 120 about bolt 142, thus moving linkage arms 50 and actuating plates 54 rearwardly. The rearward movement of arms 50 results in wheels 26 obtaining their lowered positions so that the forward end of housing 22 attains its highest cutting height. Further, the rearward movement of actuating plates 54 results in pivoting of lift shaft 58 so that hitch arms 64 are pivoted downwardly to allow openings 110 to receive bushings 112. After openings 110 have received bushings 112, latch pin mechanisms 114 are actuated to their closed, locked position. Deck stand 150 must then be removed to allow operation of the deck and vehicle together.

Once deck 20 is attached to vehicle 24, the height of housing 22 is adjusted by manipulating lever 118. More particularly, as lever 118 is moved forwardly, the front portion of housing 22 will be lowered as a result of linkage arms 50 manipulating parallel linkages 32 to raise wheels 26. Further, forward movement of lever 118 results in rotational force being applied to shaft 58, this force attempting to pivot hitch arms 64 upwardly. However, because arms 64 are secured in a generally horizontal orientation, as illustrated in FIG. 6, by bushings 112, the rotational force results in the lowering of the rear portion of housing 22. Downward motion of the rear portion of housing 22 is allowed because deck stand 150 is either not present or is in a retracted position.

In order to raise deck 20 to the near vertical position shown in FIG. 4, an operator must first install deck stand 150 and thereafter collapse lift lever 118 downwardly so that it lies generally along housing 22. As described above, this is done by the operator pushing end 145 of plate 136 toward lever 118 such that locking aperture 140 disengages bolt end 144. An operator must then disconnect the power take-off shaft (not shown). After the disengagement of locking aperture 140 from bolt end 144, lifting lever 118 can be rotated about bolt 56 so that it lies generally upon the upper surface of housing 22.

In order to raise the deck to a storage/maintenance position, it is now necessary to configure mechanisms 66 from their locked to their unlocked positions. The first step in performing this function is to manually rotate levers 80 in a generally clockwise direction, such that hook 82 of latch 76 disengages locking pin 84, and such that notch 100 of latch 76 engages L-shaped member 98 of torsion spring 94. This intermediate configuration of mechanism 66 is shown in FIG. 8. In this position, latch member 76 is held against the bias of torsion spring 90 by the L-shaped member 98 of torsion spring 94, and hook 82 of latch member 76 is capable of clearing locking pin 84.

The operator thereafter moves around to the front of deck 20 and begins to lift upwardly, thus resulting in rotation between hitch arms 64 which are still secured to vehicle 24 and lift shaft 58 secured to housing 22. This rotation occurs about pivot pin 74 in each mechanism 66. After a small amount of rotation upward on the front end of deck 20, L-shaped member 98 engages release pin 96 and is disengaged from notch 100. Thereafter, the bias applied to latch 76 by torsion spring 90 rotates the latch in a counterclockwise direction. This disengagement of latch 76 from member 98 is shown in FIG. 9. In this figure, it is apparent that hook 82 of latch 76 has cleared locking pin 84 so as to not interfere with further rotation of deck 20 upwardly. This disengagement from the intermediate position shown in FIG. 8 occurs automatically during the upward rotation of the deck, and results in latch 76 being positioned in an automatic reconnecting orientation, as will be more fully described below. As the continued rotation of deck 20 upwardly occurs, roller 156 of supports 154 engage the ground and provide support for the approaching vertical orientation of deck 20. Once deck 20 nears the vertical orientation, an operator can utilize securing linkage 158 to hold deck 20 in its upper position. More specifically, linkage 158 can extend from hinge area 160 and be attached to the body of vehicle 24 via hook 162 at any suitable location. The completely rotated arrangement of mechanism 66 is shown in FIG. 10.

In this raised position, maintenance and cleaning operations can be performed on the mower blades on the bottom of deck 20. Thus, significant advantages are gained over prior art mowers which did not allow this tilt-up operation of the forwardly positioned deck, especially when connected to the propelling vehicle. Still further, in this raised orientation, the vehicle and deck can be stored or rolled onto a trailer for transportation to another location without requiring significant amounts of space on the trailer.

In order to return deck 20 to its operating position, an operator first unhooks securing linkage 158 from its attachment point to the vehicle. The operator then slowly lowers the deck downwardly. As this is done, once the deck reaches the position shown in FIG. 9, camming surface 104 of latch 76 engages locking pin 84. Continued downward rotation of deck 20 results in locking pin 84 sliding along camming surface 104 and the tensioning of torsion spring 90 due to the clockwise rotation of latch 76. The clockwise rotation against torsion spring 90 continues to occur with downward rotational movement of deck 20 until such point that locking pin 84 is capable of engagement with hook 82 of latch 76. When pin 84 reaches this position, the bias in spring 90 forces latch 76 in a counterclockwise direction automatically, such that hook 82 engages pin 84. Therefore, as is apparent, as the deck is lowered, mechanism 66 automatically reaches the locked position shown in FIG. 7 when the deck is horizontal. This automatic locking is accomplished through camming surface 104 and the bias in torsion spring 90.

After deck 20 is horizontal and locked in place, lever 118 can be returned to its operating position by pulling it upwardly such that camming appendage 148 engages bolt 142, and thereafter automatically positions locking aperture 140 about bolt 144. Deck stand 150 is then removed and the power take-off shaft (not shown) is connected. Deck 20 is then ready for operation and the height of the deck can be adjusted utilizing lever 118.

Mechanisms 66 allow the operator an easy and efficient manner to raise deck 20 to a near vertical position. In particular, all that is required is a simple rotational action of lever 80 on each mechanism 66 to the intermediate holding position shown in FIG. 8. Thereafter, the operator can move around to the front of the deck and lift it upwardly to the vertical position. As discussed above, there is no need to reactuate levers 80 in any manner to ensure that the deck is locked in its horizontal position when lowered. The provision of release pin 96, camming surface 104, and the bias of torsion spring 90 ensure that as the deck is lowered, latch members 76 automatically are secured in their latched positions about locking pin 84. Therefore, deck 20 can be raised and lowered with a minimal amount of effort and time.

From the foregoing, it will be seen that this invention is one well-adapted to attain all the ends and objects hereinabove set forth together with other advantages that are obvious and that are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

We claim:

1. A mower comprising:

a propelling vehicle;

a mower deck having at least one mower blade and positioned adjacent the front end of the vehicle;

a lift shaft rotatably supported by the mower deck;

at least one hitch arm fixedly coupled on one end to said lift shaft and attached to the front end of said propelling vehicle on its other end; and a rotatable joint located adjacent said lift shaft and allowing said deck to be rotated from a horizontal position to a raised position to allow access to said mower blade.

2. The mower of claim 1 further comprising at least one wheel attached to the front of said deck and at least one support attached to the rear of said deck, wherein, when said deck is in a horizontal position, said wheel engages a ground surface and said support does not engage the ground surface, and, when said deck is in its raised position, said support engages the ground and said wheel does not engage the ground surface.

3. The mower of claim 2 wherein there are two of said front mounted wheels and wherein there are two of said rear mounted supports.

4. The mower of claim 2 wherein said support has a roller on its lower end.

5. The mower of claim 1 wherein said joint locks said deck in its horizontal position.

6. The mower of claim 5 wherein said joint has a manually operable lever for unlocking said deck from its horizontal position.

7. The mower of claim 1 wherein said joint automatically returns to a locked position upon lowering of said deck to said horizontal position.

8. The mower of claim 1 further comprising a manually operable lever attached to said deck for adjusting the height of said mower deck during operation, said lever having a means for collapsing itself between a raised operating position and a stored position which is generally along a top surface of said deck.

9. A flip up mower deck for attachment to a propelling vehicle, the deck comprising:

a lift shaft rotatably supported by the mower deck;

at least one hitch arm capable of being coupled on one end to the propelling vehicle and coupled on its other end to said lift shaft through a rotating joint, said rotating joint having a locked and an unlocked position, said locked position substantially fixing said hitch arm with respect to said lift shaft, and said unlocked position allowing said hitch arm to rotate with respect to said lift shaft so that the deck can be positioned in a raised position.

10. The mower deck of claim 9 wherein said hitch arm is pivotally mounted to said lift shaft about a pivot point, said lift shaft having a latch pivotally mounted thereto and manually operable, said hitch arm having a locking pin, and wherein said latch engages said locking pin when said joint is in said locked position and said latch is disengaged manually from said pin when said joint is in said unlocked position.

11. The mower deck of claim 10 wherein said latch is biased towards a position that allows it to engage said pin.

12. The mower deck of claim 11 further comprising means for holding said latch in a position that is disengaged from said pin against the bias of the latch.

13. The mower deck of claim 12 further comprising means for allowing said latch to return to its biased position toward said pin after said deck reaches a predetermined rotational location.

\* \* \* \* \*